F. E. SHIELDS.
MANURE SPREADER.
APPLICATION FILED SEPT. 19, 1907.

898,934.

Patented Sept. 15, 1908.
3 SHEETS—SHEET 1.

Witnesses
Inventor
F. E. Shields
By
Attorneys

F. E. SHIELDS.
MANURE SPREADER.
APPLICATION FILED SEPT. 19, 1907.

898,934.

Patented Sept. 15, 1908.
3 SHEETS—SHEET 2.

Witnesses

Inventor
F. E. Shields
By
Attorney

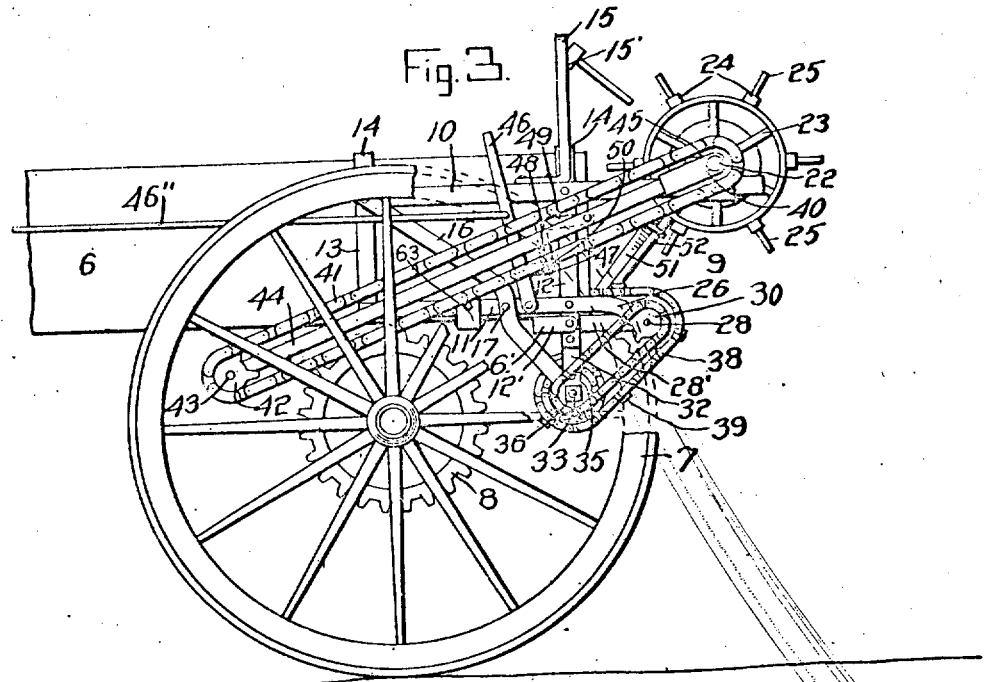
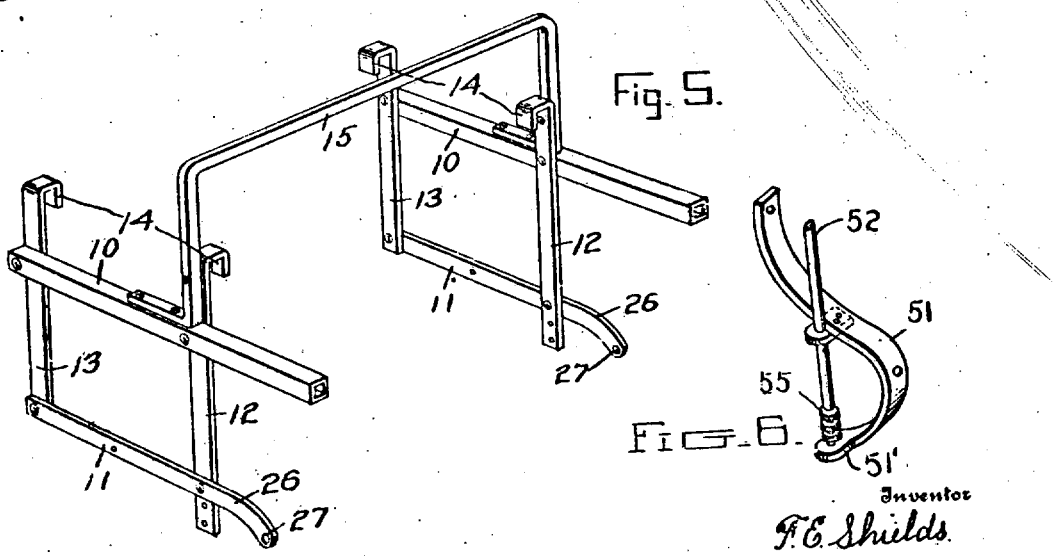

UNITED STATES PATENT OFFICE.

FRED E. SHIELDS, OF MASSENA, IOWA.

MANURE-SPREADER.

No. 898,934.  Specification of Letters Patent.  Patented Sept. 15, 1908.

Application filed September 19, 1907. Serial No. 393,665.

*To all whom it may concern:*

Be it known that I, FRED E. SHIELDS, a citizen of the United States, residing at Massena, in the county of Cass, State of Iowa, have invented certain new and useful Improvements in Manure-Spreaders; and I do hereby declare the following to be a full, clear, and exact description of the invention, such as will enable others skilled in the art to which it appertains to make and use the same.

This invention relates to new and useful improvements in manure spreaders, and distributers and it has particular reference to a mechanism of this class which includes a conveyer movable longitudinally of a wagon, a reel upon which the conveyer is wound, and a toothed drum or cylinder for throwing the manure from the wagon.

Figure 1:
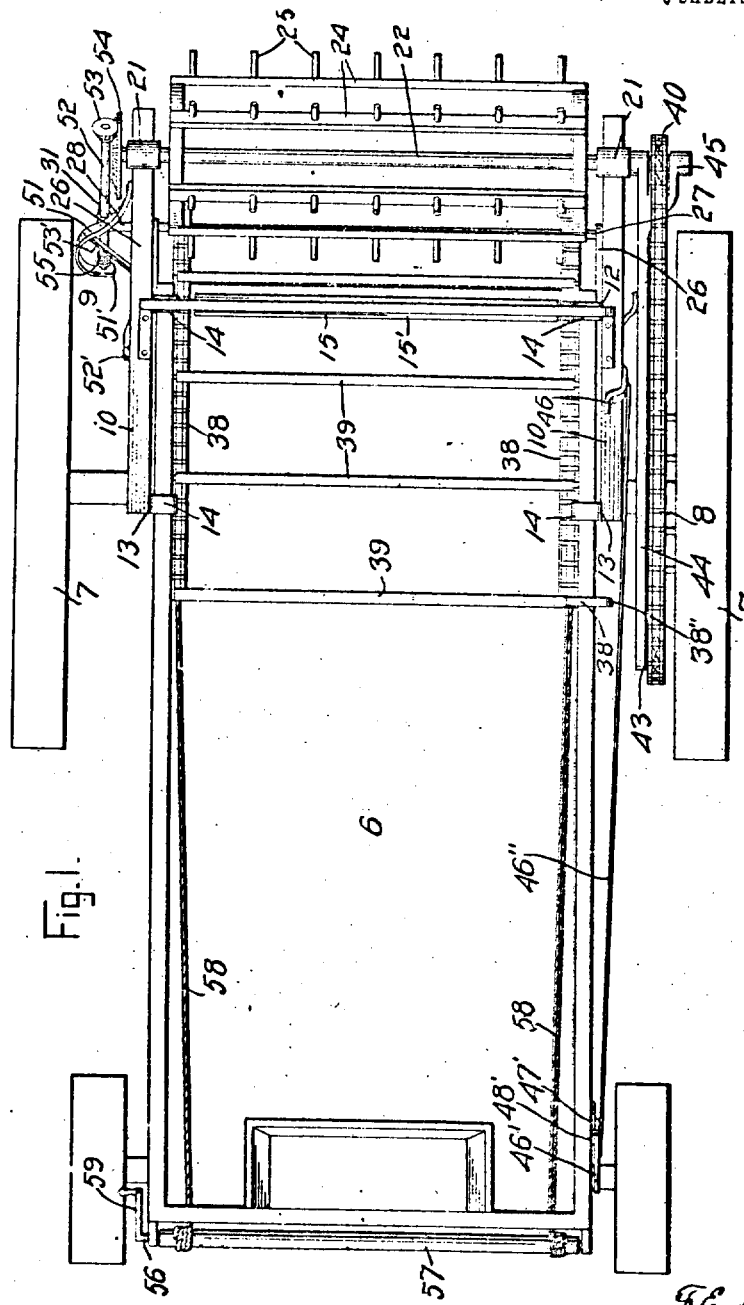
Figure 4:
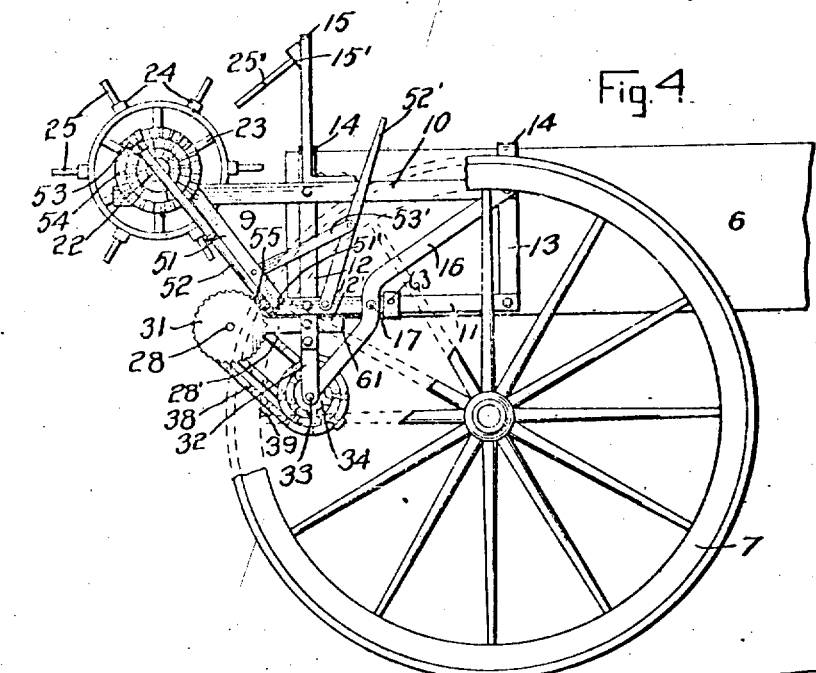
Figure 2:
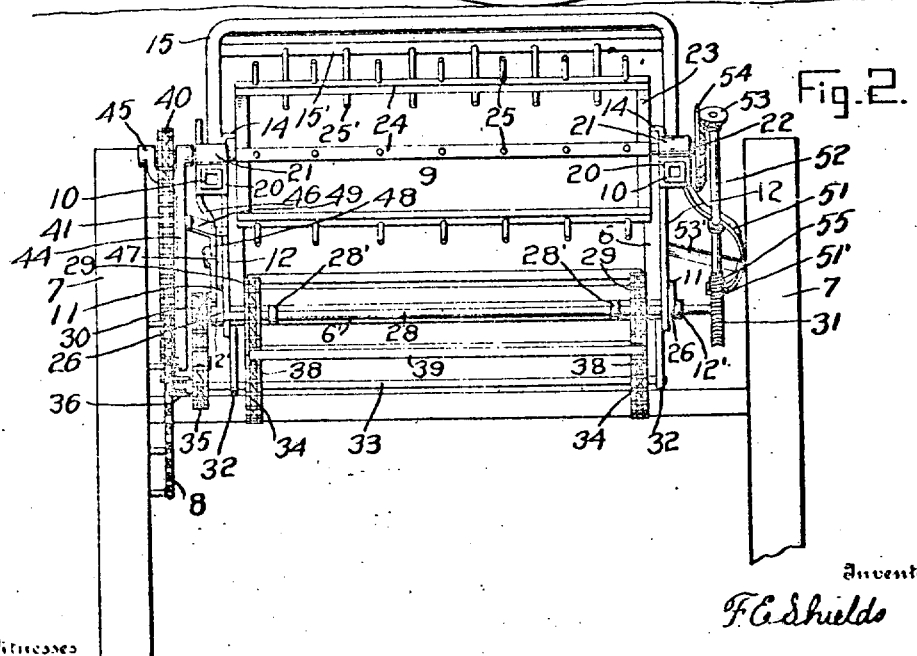

In connection with an apparatus constructed generally as above described, the invention aims as a primary object to provide a novel construction, combination and arrangement of parts, the details of which will appear in the course of the following description in which reference is had to the accompanying drawings forming a part of this specification, like characters of reference designating similar parts throughout the several views, wherein:

Figure 1 is a top plan view showing the manner of use of a manure spreader constructed in accordance with the present invention. Fig. 2 is an end elevation thereof. Fig. 3 is a fragmentary elevation looking at that side of the wagon from which the operative parts are driven. Fig. 4 is a fragmentary elevation looking at the opposite side of the wagon. Fig. 5 is a detailed view of the supporting frame. Fig. 6 is a fragmentary view illustrating a detail of the invention.

Referring to the accompanying drawings, the numeral 6 designates the wagon, and the numeral 7 designates the traction wheels thereof, one of which carries the drive sprocket 8.

The apparatus comprehended in the present invention is designated generally by the numeral 9 and comprises essentially a frame and operating elements carried thereby. The frame includes parallel upper and lower side bars 10 and 11 arranged in pairs and connected by an elongated vertical bar 12, and a shorter vertical bar 13. The bars 12 and 13 are constructed at their upper ends with recurvate hooks 14 which are designed to engage the sides of the wagon and the bars 12 are connected by an arch shaped member 15 which is employed to strengthen the same. Between the bars 10 and 13 at their junction, and the lower end of the bars 12, diagonal braces 16 are interposed, and the latter have connection as at 17 with the respective bars 11. The bars 10 are preferably of hollow rectangular construction and upon the rear ends thereof conformable sleeves 20 are adjustably mounted, the latter carrying suitably constructed bearings 21, in which a transverse shaft 22 is journaled. At the ends of the shaft 22 are mounted spiders 23 which conformably support transverse beams 24, the latter being provided with radially projecting teeth 25 which distribute the manure from the rear end of the wagon.

The bar 15 carries a rake head 15' provided with downwardly inclined teeth 25' which coöperate with the teeth 25 to comminute the manure as it is discharged from the wagon. The bars 11, at their rear ends are curved downwardly as at 26 and are constructed with bearings 27 in which a transverse shaft 28 is journaled. For the purpose of reinforcing the rear end of the wagon body a transverse bar 6' is employed and which is supported therebeneath. The bar 6' is formed at its ends with rearwardly projecting arms 12' which are rigidly secured to the bars 12 and adjacent the arms 26 with arms 28' of greater length which are formed to surround and brace the shaft 28. The latter carries between said bars sprocket wheels 29 and at one end thereof, a sprocket wheel 30 and at the other end thereof, a worm wheel 31. The bars 12, at their lower ends have connection with hangers 32, which support a transverse shaft 33, the latter carrying between said hangers sprockets 34 and at one end thereof a loose sprocket 35 which is engaged by a friction clutch member 36 provided on the end of the shaft 33.

The conveyer is constituted of parallel chains 38 carrying the usual transverse slats 39 for forcing the material to the rear end of the wagon. The chains 38 are trained over the sprocket wheels 29 of the shaft 28 and are engaged with the sprocket wheels 34 of the shaft 33, the last named sprocket wheels, together with said shaft 33, constituting a winding reel for the chain. The shaft 22 projects at one end beyond its bearings 21 and carried a sprocket wheel 40 and a chain 41 is trained over the same and an idler sprocket 42 mounted upon a stud 43 provided at the end of a bar 44. The latter at its rear end carries a suitable yoke 45 which pivotally surrounds the projecting end of the shaft 22. Pivoted to the adjacent bar 11 is a hand lever 46, which at some distance above its connection with the bar 11, is pivoted to a link 47 and the latter is in turn pivoted as at 50 to the vertical arm 48 of a bell crank lever provided with a horizontal arm 49. The arm 49 has pivotal connection with the bar 44 and it will be apparent that movement of the lever 46 rearwardly, will, through the connections described, result in raising said bar on the shaf 22 as a pivot, whereby the chain 41 will e lifte out of engagement with the sprocket 8 with which it is normally engaged to drive the operative parts.

Means are provided for operating the bar 44 to throw the machine out of gear from the front end of the wagon and with this object in view, a lever 46' is pivoted adjacent the driver's seat and has connection by a link 46" with the lever 46 above the pivot of the latter. The lever 46' works about a rack quadrant 47' and has a trigger operated pawl 48' for engagement with said rack quadrant. Automatic means are provided for operating the bar 44 to throw the machine out of gear at the completion of the rearward travel of the conveyer and with this object in view one of the chains 38 carries a casting 38' which overhangs one side of the wagon and is constructed with a depending portion having a projection 38" which engages the lever 46 at the termination of the rearward movement of the conveyer.

The frame has one of its bars 10 constructed with a curved member 51 mounted for pivotal adjustment and which is constructed with bearings 51' for an inclined shaft 52 carrying at its upper end a slidably adjustable bevel pinion 53 which is in mesh with a similar changeable speed pinion 54 provided on the end of the shaft 22 and having two or more concentric rows of cogs. The shaft 52, adjacent its lower end carries a worm 55, which meshes with the worm wheel 31. A hand lever 52 has connection by means of a link 53' with the member 51 whereby, upon proper movement of said lever, the worm 55 may be moved into or out of engagement with the worm wheel 31, in the respective forward or reverse movement of the conveyer. The wagon supports at its front end a transverse shaft 56 carrying a pulley 57 to which the ropes 58 are connected. The ropes 58 are in turn connected to the chains 38. The shaft 56 carries at its projecting end a crank handle 59 adjacent the driver's seat. Prior to loading the wagon the shaft 56 is rotated by means of the crank handle 59 to unwind the conveyer from the reel above described, whereby the same may have the greatest amplitude of action.

The manner of use will be readily apparent from the foregoing description. As the wagon traverses the field, the chain 41 is driven from the sprocket wheel 8 and in such action revolves the distributing drum at a high rate of speed. The shaft 22 of the latter through the gear connections described, actuates the conveyer at a much lower speed to feed the material rearwardly for action by the distributing drum. The entire apparatus may be thrown out of gear by operating the lever 46 in the manner above described. It is preferred to assemble the apparatus upon a wagon by connecting the bars 11 by a transverse bar 63 which is held beneath the wagon in any suitable manner.

The device may be readily assembled or disassembled without in any way marring or affecting the assemblage of the parts of the wagon, is simple in its structural details, comparatively inexpensive to manufacture and practical and efficient in use.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts without departing from the spirit and scope of the invention as defined in the appended claims.

What is claimed is:

1. An apparatus of the class described, comprising a frame including upper and lower parallel bars at each side thereof, vertical bars connecting the respective pairs of upper and lower bars, said vertical bars having recurvate upper ends, a brace member arranged transversely of said frame, said upper bars being constructed at their rear ends with bearings, a transverse shaft journaled in said bearings, a distributing cylinder mounted on said shaft, said lower bars having their rear ends constructed with bearings, a second transverse shaft supported between said bearings, sprocket wheels mounted on said second transverse shaft, a conveyer including parallel chains trained over said sprocket wheels, the rear ends of said vertical bars being provided with bearings at their lower ends, a winding shaft journaled in said last named bearings, sprocket wheels carried thereon to receive the chains of said conveyer, gearing for driving said winding shaft from said second shaft, gearing for driving said second shaft from said first shaft, said first shaft carrying at one end thereof a sprocket wheel, a bar having its end constructed to pivotally surround said first shaft, a sprocket wheel provided at the other end of said bar, a chain trained over said last named sprocket wheel and means for raising and lowering said bar.

2. In an apparatus of the class described, the combination with a wagon body, of a frame having upper and lower parallel bars at each side thereof, vertical bars connecting the said upper and lower bars, each of said vertical bars having hooks for detachably connecting the frame to the wagon body, a distributing drum carried by the frame, a rake head on the frame, a conveyer mechanism receiving the load within the wagon and mounted on the frame, means for driving said distributing drum, and driving means between said distributing drum and conveyer mechanism.

3. In an apparatus of the class described, the combination with a wagon body, of a frame having upper and lower parallel bars at each side thereof, vertical bars connecting the said upper and lower bars, each of said vertical bars having hooks for detachably connecting the frame to the wagon body, a distributing drum carried by the frame, a rake head on the frame, a conveyer mechanism receiving the load within the wagon and mounted upon the frame, means for driving said distributing drum, driving means between said distributing drum and the conveyer mechanism, and independent manually operable means for releasing the driving means for the distributing drum and the conveyer mechanism.

In testimony whereof, I affix my signature, in presence of two witnesses.

FRED E. SHIELDS.

Witnesses:
D. P. HOGAN,
JOANNA WAGNER.